US007680856B2

(12) United States Patent
Qureshi

(10) Patent No.: US 7,680,856 B2
(45) Date of Patent: Mar. 16, 2010

(54) STORING SEARCHES IN AN E-MAIL FOLDER

(75) Inventor: Imran I. Qureshi, Milpitas, CA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 10/996,117

(22) Filed: Nov. 23, 2004

(65) Prior Publication Data

US 2006/0112081 A1 May 25, 2006

(51) Int. Cl.
*G06F 17/30* (2006.01)
(52) U.S. Cl. .................................. 707/722; 707/790
(58) Field of Classification Search ................ 707/3
See application file for complete search history.

(56) References Cited

U.S. PATENT DOCUMENTS

| | | | | |
|---|---|---|---|---|
| 6,173,284 | B1 * | 1/2001 | Brown | 707/10 |
| 6,226,630 | B1 * | 5/2001 | Billmers | 707/3 |
| 6,226,655 | B1 * | 5/2001 | Borman et al. | 715/207 |
| 6,230,156 | B1 * | 5/2001 | Hussey | 707/10 |
| 6,523,028 | B1 * | 2/2003 | DiDomizio et al. | 707/5 |
| 6,708,205 | B2 * | 3/2004 | Sheldon et al. | 709/206 |
| 6,938,033 | B1 * | 8/2005 | Schutzer | 707/3 |
| 7,437,353 | B2 * | 10/2008 | Marmaros et al. | 707/3 |
| 7,496,559 | B2 * | 2/2009 | Gross et al. | 707/3 |
| 2002/0099775 | A1 * | 7/2002 | Gupta et al. | 709/205 |
| 2003/0041112 | A1 * | 2/2003 | Tada et al. | 709/206 |
| 2003/0071846 | A1 * | 4/2003 | Balassanian | 345/769 |
| 2003/0110227 | A1 * | 6/2003 | O'Hagan | 709/206 |
| 2004/0225648 | A1 * | 11/2004 | Ransom et al. | 707/3 |
| 2005/0015451 | A1 * | 1/2005 | Sheldon et al. | 709/206 |
| 2005/0080861 | A1 * | 4/2005 | Daniell et al. | 709/206 |
| 2005/0108435 | A1 * | 5/2005 | Nowacki et al. | 709/246 |
| 2005/0160083 | A1 * | 7/2005 | Robinson | 707/3 |
| 2005/0198299 | A1 * | 9/2005 | Beck et al. | 709/226 |
| 2006/0053293 | A1 * | 3/2006 | Zager et al. | 713/176 |

OTHER PUBLICATIONS

Medline Tutorial: Display/Save Records by Angella Lambrou, published by Aug. 20, 2001.*

* cited by examiner

*Primary Examiner*—Don Wong
*Assistant Examiner*—Sheree N Brown
(74) *Attorney, Agent, or Firm*—Vierra Magen Marcus & DeNiro LLP

(57) ABSTRACT

A method for saving search query information on a server coupled to the Internet as a search folder. The method may include the steps of: identifying a user communicating with the server; storing the search query associated with the user in a data store on the server responsive to a user instruction to store the search query; and submitting the query to an Internet search engine for execution based on a triggering event. A data structure for storing the search folder is also described.

15 Claims, 13 Drawing Sheets

STORING SEARCHES IN AN E-MAIL FOLDER

BACKGROUND OF THE INVENTION

1. Field of the Invention

The present invention is directed to techniques for searching for information on a network, particularly the Internet.

2. Description of the Related Art

Accessing information on the Internet has historically involved using a search engine accessible through a web browser. Users generally type key word information into a search interface and receive a list of results from the search engine. The search engine generally includes a local cache of the pages and a lexicon of common words. For each word, it creates a list of pages that contain that word. Queries entered by users return a list of Internet Web pages and other data formats (such as Adobe PDF and Microsoft Word documents), sorted by some rank, and links to the pages.

Generally, a user's visited site history is stored locally with the browser until cleared by a user. Some third party search engine tools allow a "search history" to be stored from session to session, if the search is performed using the tool. Often, users repeat the same searches. However, there is no effective mechanism for users to keep track of their queries and know when results of the queries change. While browser programs such as Internet Explorer track a user's visited links, they do not do so by associating the links with a given search. For example, users may search for Internet information on "beach volleyball" in order to know when local events occur, and repeat the search regularly, without any indication of previously viewed results. Certain search engine providers have developed and distributed tools which track search information by remembering a number of previous searches, but such tools do not include the ability to track changes to the search or modify the search by allowing a user ranking of hits retrieved.

In addition, the searching paradigm as a means for finding information has expanded beyond the Internet and simple file searching toward becoming the most frequent way users access any information. In the above example, a user may wish to view items from their own personal information which meet the search query, such as scheduling of information about beach volleyball events.

Hence, a method and system allowing a user to store and track search results would be of great value.

SUMMARY OF THE INVENTION

In one aspect, the invention comprises a method for saving search query information on a server coupled to the Internet. The method may include the steps of: identifying a user communicating with the server; storing the search query associated with the user in a data store on the server responsive to a user instruction to store the search query; and submitting the query to an Internet search engine for execution based on a triggering event. In a further aspect, the data store includes personal user information associated with the user, including at least e-mail information. In another aspect, the invention may include the step of executing the query against the data store.

In another embodiment, the invention is a method of providing a service to a user of a computer network. In this aspect, the invention includes providing a web-based e-mail service including user information data store and an e-mail user interface accessing information in the data store; storing a search query as a folder definition in the user information data store; and presenting Internet search query results in the e-mail user interface. In a further aspect, the step of presenting includes presenting user information data store search query results in the e-mail user interface. In addition, the personal information may include contact and calendar information.

In a further embodiment, the invention is a computer-readable medium having stored thereon a data structure. In one aspect, the data structure includes a first data field containing data representing a user identifier. A second data field derived from the first field contains data representing a search query, and a third data field contains personal information of the user. A fourth field functions to record results of a predetermined data processing operation on the second data node.

These and other objects and advantages of the present invention will appear more clearly from the following description in which the preferred embodiment of the invention has been set forth in conjunction with the drawings.

DETAILED DESCRIPTION

A system and method for storing and manipulating search results across a network is described herein. The search results may be provided by a search engine running a query of Internet web sites. In general, the present invention allows a user to enter queries into a search dialog interface, save the search query in a "folder" paradigm in a user interface, and manipulate the queries in a manner similar to how users manipulate folders on a computer. The search results may be presented to the user in an email inbox format, allowing the user to manipulate and view the results in a manner which a user manipulates email information. In one aspect, the folders are saved in conjunction with a web-based e-mail service, allowing access to the search query and data associated with the query from any computer connected to the Internet. Results from the search query can be presented to the user and manipulated by the user through an e-mail inbox paradigm.

In one embodiment, the invention will be described with respect to an Internet search engine and web-e-mail service coupled to the Internet. However, it should be recognized that the invention may be used with any number of public and private networks, and search engine accessing both public and private information.

Figure 1:
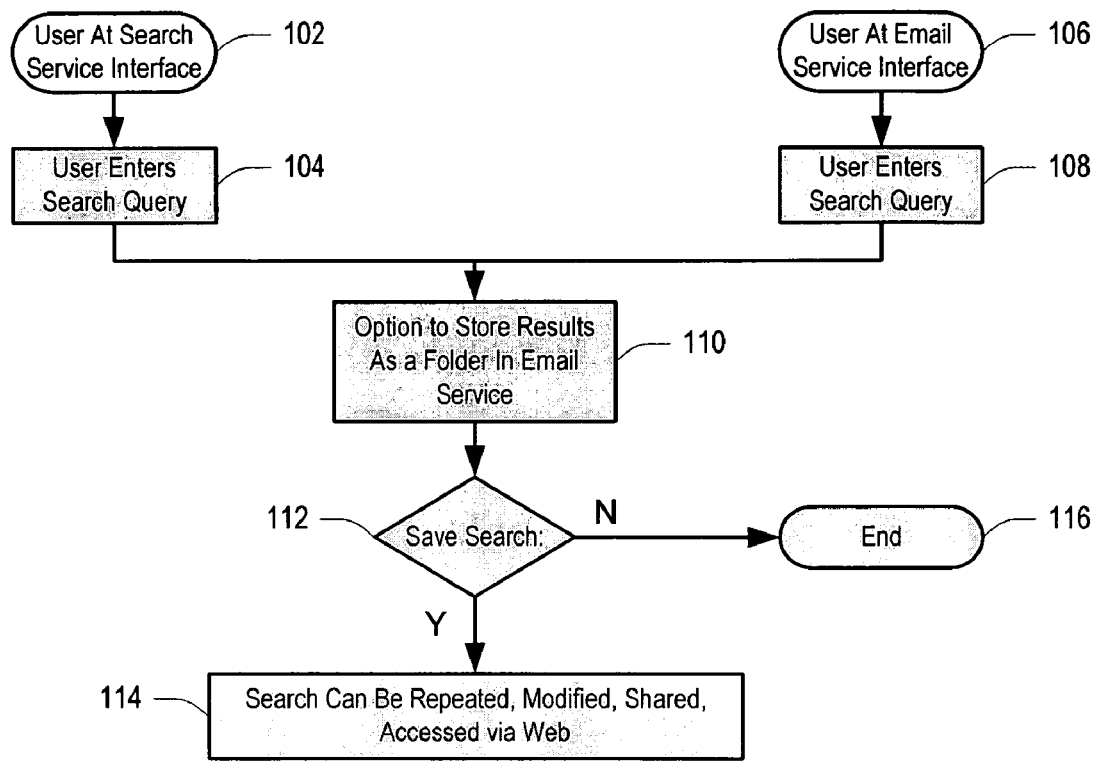
FIG. 1 is a flow chart of the general method of the present invention for saving search results as a folder.

FIG. 1 is a general overview flowchart of the method of the present invention. In FIG. 1, a user may begin a search using either a search service interface 102 or an e-mail service interface 106. A search service interface may be an interface similar to that which is provided by service providers such as Microsoft's MSN search, or other similar search services. An e-mail search service interface may be a web-based e-mail interface such as that provided by Microsoft Hotmail and similar services. In each case, as described below, a search dialog window is presented to the user allowing the user to enter a search query string and execute a search on information available on the Internet as well as personal information, using a search engine.

Once a user enters a search query at 104, at step 110, the user is presented with an option of storing the results in a search folder in an associated e-mail service. Likewise, when a user enters a search query in e-mail service at step 108, the user is presented with an option to store the results as a folder in the e-mail service at 110. At step 112, if the user selects to save the search, at step 114 the search is saved in a network or Internet accessible location. The search can thereafter be repeated, modified, shared, and accessed via any browser connected to the Internet.

Figure 2A:
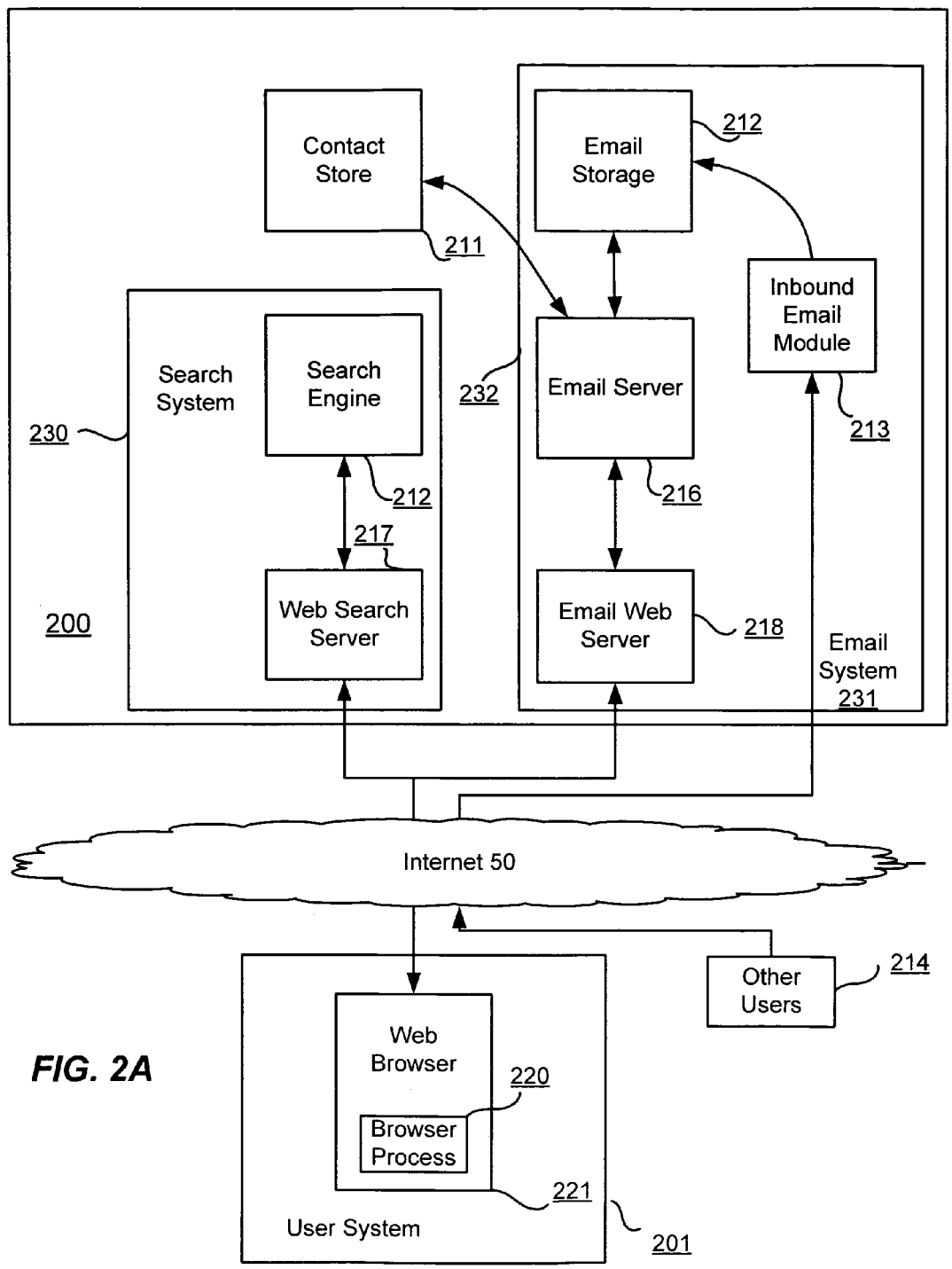
FIG. 2A is a block diagram of a system suitable for implementing the present invention including a web-based e-mail service and a search engine.

FIG. 2A is a block diagram of a system 200 for implementing the present invention. In one embodiment, system 200 includes a search system 230 and an e-mail system 231 operated by a common service provider. In another embodiment, the search system 230 and the e-mail system can be run by separate service providers. In this context, a service provider is a person or a computer responsible for maintaining each service and making decisions about services provided by the systems 230,231.

In the embodiment of FIG. 2A, a service provider runs both the web-based e-mail service 231 and search service 230, allowing information to easily be shared between the services. Search system 230 may include a search engine 215 and a web search server 217. Likewise, e-mail system 231 may include an e-mail web server 218, e-mail server 216, e-mail data storage 212 and an inbound e-mail module 213. Also shown in FIG. 2A is an address book contact store 211.

A plurality of user systems 201 may connect to the search system 230 and e-mail service 231. A user system 201 may be a computing system such as that discussed below with respect to FIG. 2B and include thereon a web browser 221 having one or more browser processes 220 running in the web browser 221.

In order to provide services to a user, the system may include a mechanism for registering users and creating user accounts with the system. The user accounts allow the system provider to supply additional services to the users and track information within the system (such as email data) for each user. System 200 includes a login facility allowing users having accounts with the e-mail system 231 to submit such login information and maintain various types of information in system 200. When a user creates an account on system 200, the user provides a unique user identifier, usually in the format of an e-mail address. Account information for the user is stored in the contact store 211 and e-mail data store 212. Once an account is created, the user may be considered a domain user and receive e-mail at the user email address associated with the domain supplied by the system provider. Hence, users having accounts with the system are hereinafter referred to as domain users. Information particular to the user is stored in a manner which associates such information with the user in the contact store 211 and data store 212. Users who have accounts with the system may send and retrieve e-mail with other domain users and non-domain users, as well as receive additional services from the service provider, as a result of having an account with the system 200.

Users 214 which are not members of the system interact with the e-mail system by providing e-mail messages to the e-mail message module 213.

E-mail system 231 interacts with web browser 220 to provide interface pages implementing a web-based e-mail service. E-mail system 231 also performs e-mail message transfer to and from domain users and non-domain users 214. E-mail storage 212 stores user data for domain users with the e-mail system 231. Each email is stored in a database as an item using a database schema allowing the email server to easily retrieve the information for a domain user. E-mail storage 212 includes storage devices for mail content and other information in a database which includes records for each individual user, as well as e-mail data itself. Contact store 211 stores user information which can include telephone, e-mail, address, user contact lists, and other information including task lists, notes, and other items. Inbound mail module 213 receives e-mail for domain users from other users 214 outside the domain. E-mail server 216 provides e-mail data to the web server 218 which renders the data on the web browser 220. Web server 218 provides a network page rendering in the browser process 220 of web browser 221. In one embodiment this may be provided using hyper text mark up language (html). E-mail server 216 also loads the browser process into the web browser and sends script instructions such as JAVA script to the browser to process to implement the e-mail service.

A number of user systems 201 may be coupled to the web server via the Internet 50. User systems 201 may also use web browser 221 to communicate with the web search server 217. The web search system 230 includes a search engine 215 and web search system 230. The web search server 217 renders interface pages for the search engine 215. The search engine 215 generally includes a program which crawls the web, stores a local cache of the pages it finds, and builds a lexicon of common words. For each word, it creates a list of pages that contain that word. A query for a given word returns that list, sorted by a ranking algorithm that is generally different for each engine. In a system 200 such as that shown in FIG. 2A, search dialogs presented by either the web search server 217 or the e-mail web server 218 can be acted upon by the search engine 212. As queries are typed into the interface pages rendered in the browser process 220, the web search server provides the query string to the search engine, and retrieves results from the search engine to be rendered in a user interface in web browser 220. Normally, such results are shown as a list of "hits" retrieved by the search engine which match key words in the query string entered in the search dialog.

In accordance with the invention, queries provided by the user via the interface in browser process 220 can be stored in e-mail storage 212. As will be detailed further below, when an instruction is received from the user to store a search, a folder record is created in e-mail storage 212. The folder record includes a type definition identifying the record as a special folder type, and a number of attributes including, in one embodiment, the query string. This "search folder" definition is maintained by the e-mail server in e-mail storage 212 and may be modified by data items stored within the email data store 217 which store addition information about items retrieved by a search query, as described with respect to FIG. 14.

When the e-mail web server 218 retrieves user information from the e-mail storage 212, a portion of the page is rendered to show the search folder in the browser interface. This allows the user to manipulate the stored query which is saved along with the e-mail data for the particular domain user of the e-mail system 231. Additional functions, features and attributes of the e-mail storage record will be discussed in detail below.

An exemplary system for implementing the invention includes a general purpose computing device in the form of a computer 290. Components of computer 290 may include, but are not limited to, a processing unit 252, a system memory 253, and a system bus 285 that couples various system components including the system memory to the processing unit 252. The system bus 285 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 290 typically includes a variety of computer readable media. Computer readable media can be any available media that can be accessed by computer 290 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 290. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2B:
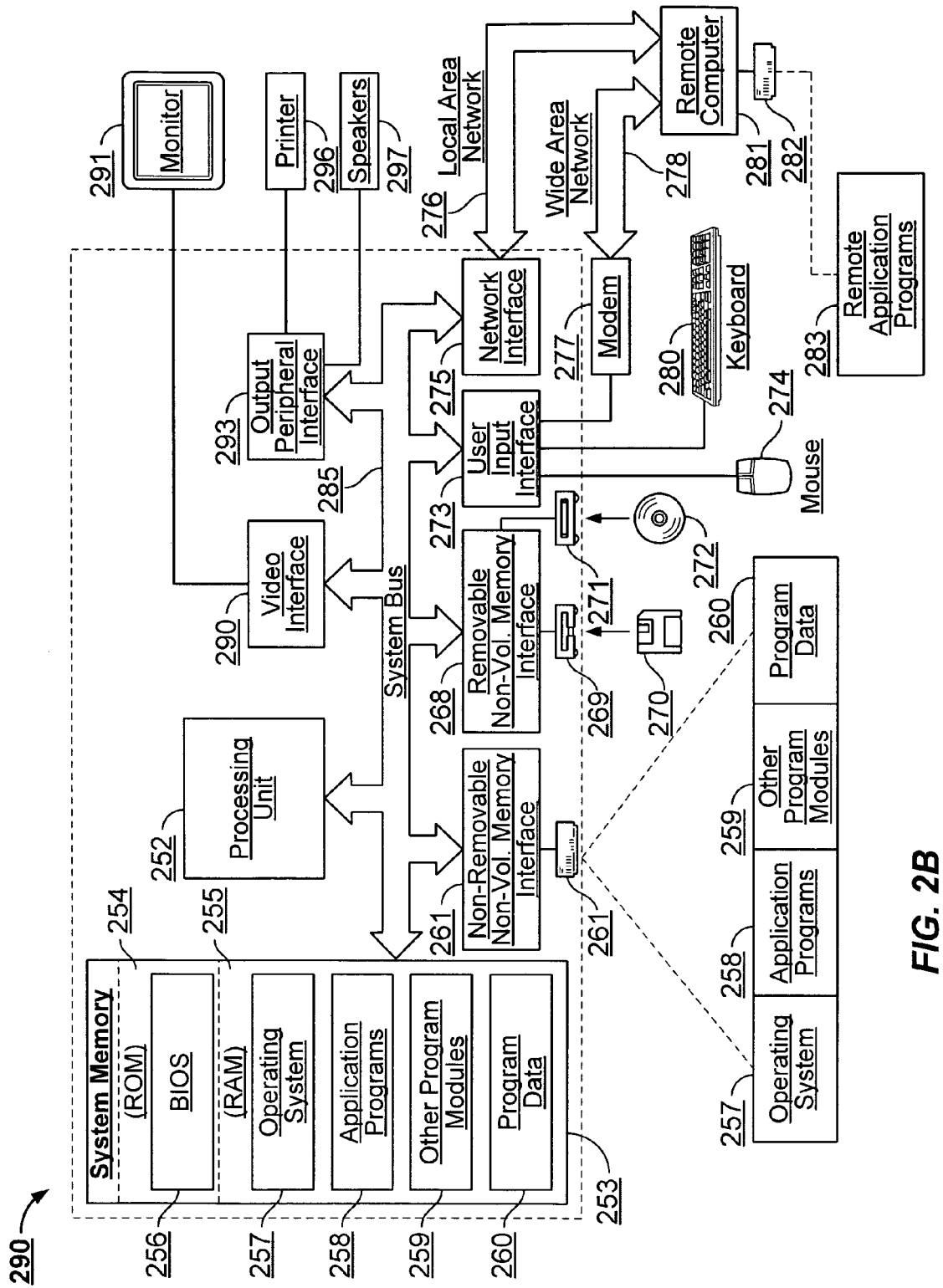
FIG. 2B is a block diagram of a computer processing device suitable for implementing each of the computer processing devices identified in FIG. 2A.

The system memory 253 includes computer storage media in the form of volatile and/or nonvolatile memory such as read only memory (ROM) 254 and random access memory (RAM) 255. A basic input/output system 256 (BIOS), containing the basic routines that help to transfer information between elements within computer 290, such as during start-up, is typically stored in ROM 254. RAM 255 typically contains data and/or program modules that are immediately accessible to and/or presently being operated on by processing unit 252. By way of example, and not limitation, FIG. 2B illustrates operating system 257, application programs 258, other program modules 259, and program data 260.

The computer 290 may also include other removable/non-removable, volatile/nonvolatile computer storage media. By way of example only, FIG. 2B illustrates a hard disk drive 261 that reads from or writes to non-removable, nonvolatile magnetic media, a magnetic disk drive 269 that reads from or writes to a removable, nonvolatile magnetic disk 270, and an optical disk drive 271 that reads from or writes to a removable, nonvolatile optical disk 272 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 262 is typically connected to the system bus 285 through a non-removable memory interface such as interface 261, and magnetic disk drive 269 and optical disk drive 271 are typically connected to the system bus 285 by a removable memory interface, such as interface 268.

The drives and their associated computer storage media discussed above and illustrated in FIG. 2B, provide storage of computer readable instructions, data structures, program modules and other data for the computer 290. In FIG. 2B, for example, hard disk drive 262 is illustrated as storing operating system 263, application programs 264, other program modules 265, and program data 266. Note that these components can either be the same as or different from operating system 257, application programs 258, other program modules 259, and program data 260. Operating system 263, application programs 264, other program modules 265, and program data 266 are given different numbers here to illustrate that, at a minimum, they are different copies. A user may enter commands and information into the computer 290 through input devices such as a keyboard 280 and pointing device 274, commonly referred to as a mouse, trackball or touch pad. Other input devices (not shown) may include a microphone, joystick, game pad, satellite dish, scanner, or the like.

These and other input devices are often connected to the processing unit 252 through a user input interface 273 that is coupled to the system bus, but may be connected by other interface and bus structures, such as a parallel port, game port or a universal serial bus (USB). A monitor 291 or other type of display device is also connected to the system bus 285 via an interface, such as a video interface 290. In addition to the monitor, computers may also include other peripheral output devices such as speakers 297 and printer 296, which may be connected through an output peripheral interface 293.

The computer 290 may operate in a networked environment using logical connections to one or more remote computers, such as a remote computer 281. The remote computer 281 may be a personal computer, a server, a router, a network PC, a peer device or other common network node, and typically includes many or all of the elements described above relative to the computer 290, although only a memory storage device 282 has been illustrated in FIG. 2B. The logical connections depicted in FIG. 2B include a local area network (LAN) 276 and a wide area network (WAN) 278, but may also include other networks. Such networking environments are commonplace in offices, enterprise-wide computer networks, intranets and the Internet.

When used in a LAN networking environment, the computer 290 is connected to the LAN 276 through a network interface or adapter 275. When used in a WAN networking environment, the computer 290 typically includes a modem 277 or other means for establishing communications over the WAN 278, such as the Internet. The modem 277, which may be internal or external, may be connected to the system bus 285 via the user input interface 273, or other appropriate mechanism. In a networked environment, program modules depicted relative to the computer 290, or portions thereof, may be stored in the remote memory storage device. By way of example, and not limitation, FIG. 2B illustrates remote application programs 283 as residing on memory device 282. It will be appreciated that the network connections shown are exemplary and other means of establishing a communications link between the computers may be used.

Figure 3:
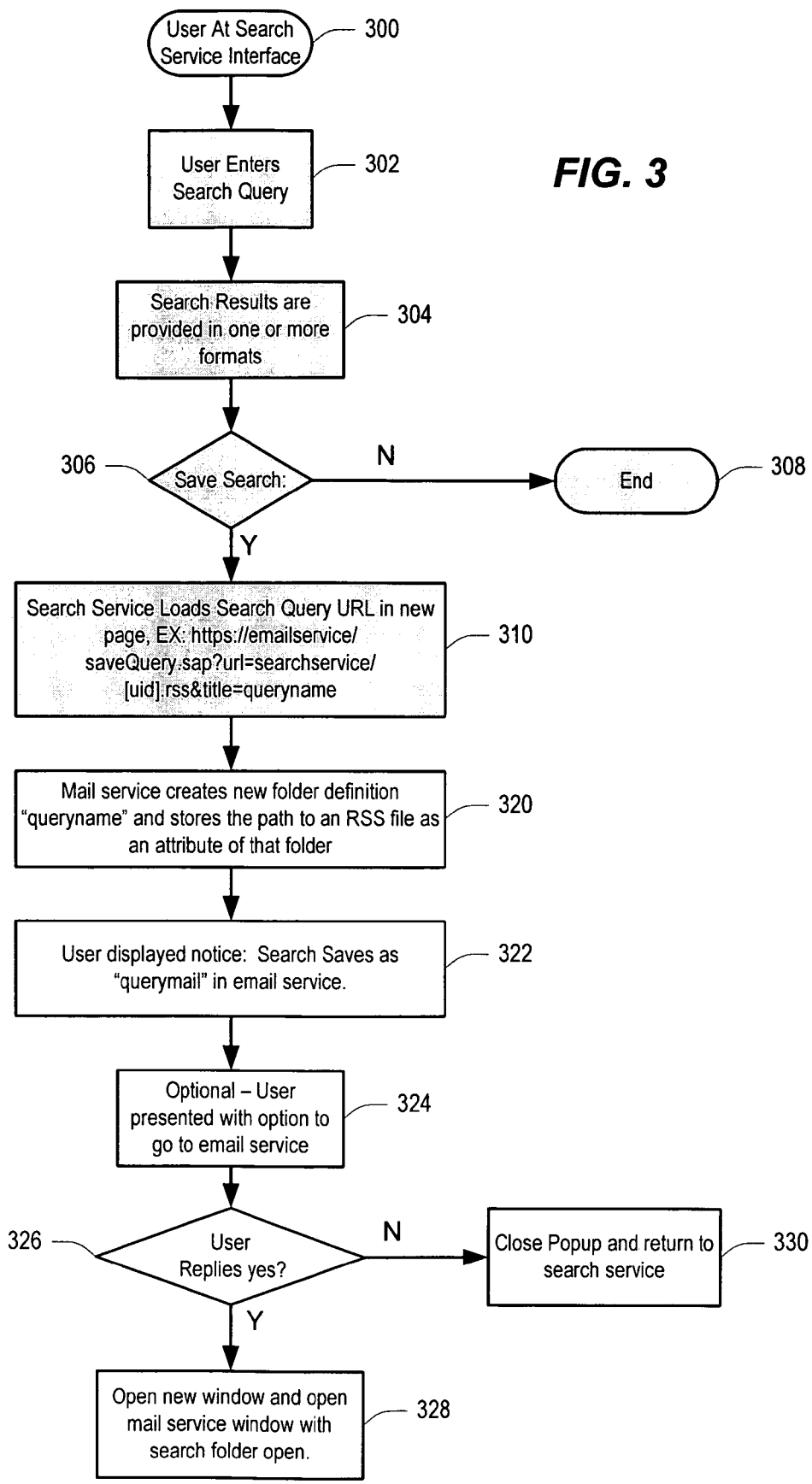
FIG. 3 is a flow chart representing an embodiment of the present invention where a user conducts a search via a search service interface.

FIG. 3 is a flowchart illustrating one embodiment of the method of the present invention. As noted with respect to FIG. 1, the user may implement the method from either a search service interface or an e-mail interface. The embodiment shown in FIG. 3 is a sequence of steps which are performed by one method of the present invention when the user begins at a search service interface. At step 300, the user is viewing a search service interface through the browser process 220 of a web browser 221 on a user system 201. At step 302, in accordance with well known techniques, a user can enter a search query into the search window of a search service interface. The search query is transmitted from the browser process 220 via the web search server 217 to the search engine 215 which renders results which are then passed back to the search server 217 to provide an interface displaying the results on the user device 201. Normally, search results are provided at step 304 to the user in a list format similar to that shown in FIG. 4.

In general, the web server 217 provides search results in a format which can be rendered by browser 221. One such format is Hyper Text Markup Language or HTML. Some search engines 212 are capable of providing results in other formats if the query request specifies a different type of request format. One such alternative result format which may be utilized for providing web content is Rich Site Summary (RSS) format. RSS is a method of describing web content available for distribution from an online publisher to web users. RSS is an application of an extensible mark-up language (XML) that adheres to the well known web consortium Resource Description Framework (RDF). Certain types of search engines 215, including Microsoft's MSN search engine, are capable of providing an output of a search result in RSS format. In this context, the web search server 217 may request the results of the search query be provided in a particular format, such as RSS. Such request can be included in the search string.

In one embodiment of the present invention, when a user enters a query at step 302, search results at step 304 can be provided in either HTML, RSS, or any other result format. At step 306, the user is presented with the option of saving the search. At step 308, if the user decides not to save the search, the process ends. However, if user decides to save the search at step 306, the search service loads the search query uniform resource locater (URL) in a new page which calls the e-mail web server 218. In the example shown in FIG. 3, step 310 shows the URL:

https://emailservice/savequery.asp?url=searchservice/[uid].rss&title=queryname.

In the aforementioned URL, the term "e-mail service" is the domain name of the e-mail web server 218. The term "savequery.asp" is a call to an active server page on the web server which is fed the instruction to save the URL for the "searchservice" with a specific identifier (uid) in RSS format (.rss) and under the title name "queryname."

Figure 4:
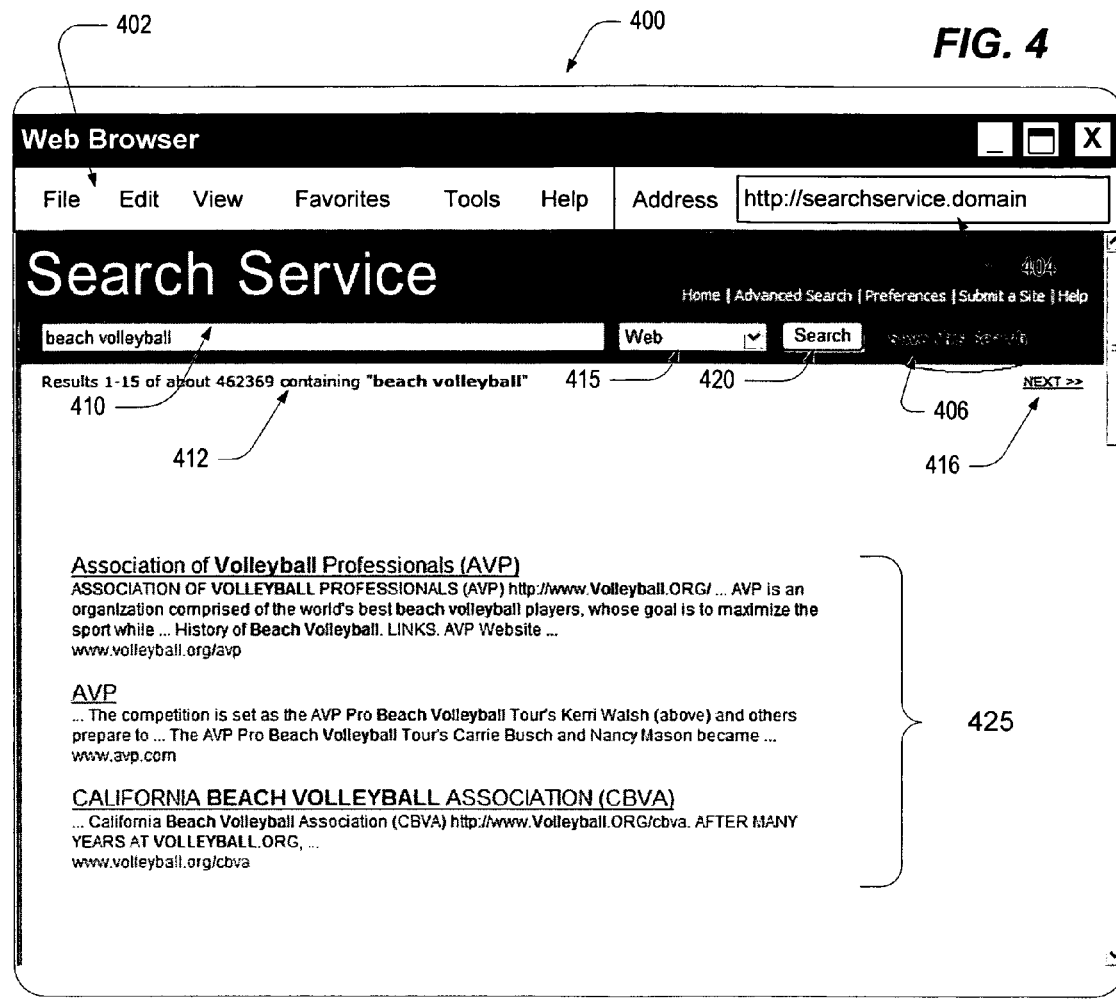
FIG. 4 is a depiction of a first user interface accessible to a user in accordance with the present invention.

FIG. 4 shows a first exemplary search service user interface 400 implemented in a web browser. The interface shows the results of a search query using the search engine and presents the user with a mechanism for saving the query "beach volleyball". FIG. 4 shows a typical web browser which includes a command bar 402 with a number of command menus which perform well understood functions and are organized under the commands "file," "edit," "view," "favorites," "tools" and "help". The browser also generally includes an address bar 404 which allows the user to type in the specific web domain address for the web page or service which the user seeks to view. In this example, the address is "searchservice.domain" which directs the user to the search server 217.

The display window 405 shows a typical search service interface after a search has been performed and result list 425 displayed. A search service interface 400 includes a query bar 410 in which a user types the keywords of the subject matter for which the user wishes to search. Also shown is a search type selector 415, which allows user to select to search different types of data sources, including news, the worldwide web (shown), images, news, or other sources, and a search execute button 420 which sends the query entered in the query window in search window 410 to the search engine 212.

Once the search engine retrieves results, the web server displays the results in a list format 425. Normally, the number of results retrieved for any particular will exceed the amount of space available in window 405. As a result, a status line 412 will show how many and what number of the results of the total number of results are being shown. The user is then presented with a "next" link to move to the next set or subset of retrieved links.

Also shown in FIG. 4 is a "save this search" link 450 which allows the user to select to save the search at step 306 in the method of FIG. 3.

Returning to FIG. 3, the previously described steps 300, 302, 304, 306 and 310 are all performed by the search service 230. Beginning with steps 320, the e-mail service 231 implements the subsequent method steps of FIG. 3.

At step 320, the e-mail service 231 creates a new folder definition associated with the domain user under the name "queryname" and stores as a query to an RSS file as an attribute of that folder. The folder data is stored in the e-mail data store 212. Optimally, the search query string includes a command requesting the format of the data which is returned as a result of the search to be in RSS format. The advantage of RSS format is that the XML format of such data makes it easy to parse and display in a manner consistent with the following description. Once stored, the search information can be manipulated by the users in a number of ways described herein.

Figure 5:
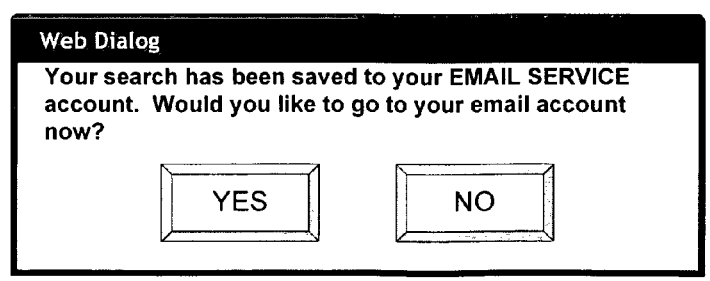
FIG. 5 is a depiction of an alert window displayed to a user in accordance with the present invention.

Steps 322-328 are optionally performed to make use of the search system easier for the domain user. At step 322, the user may optionally be displayed a notice indicating that the search has been saved under the name "query mail" in the e-mail service. At step 324, the user may be presented with an option to go to the e-mail service. This option may be presented in a pop-up window as exemplified with respect to FIG. 5. If the user replies "yes" in the window of FIG. 5, then at step 326, a new window may be opened at step 328 showing the results of the search in the newly opened window. (The window may be an interface window in a web browser such as that described below with respect to FIG. 6 or 8.) If the user chooses not to go to the new service, the pop up can be closed at step 330 and the user returned to the search service.

Figure 6:
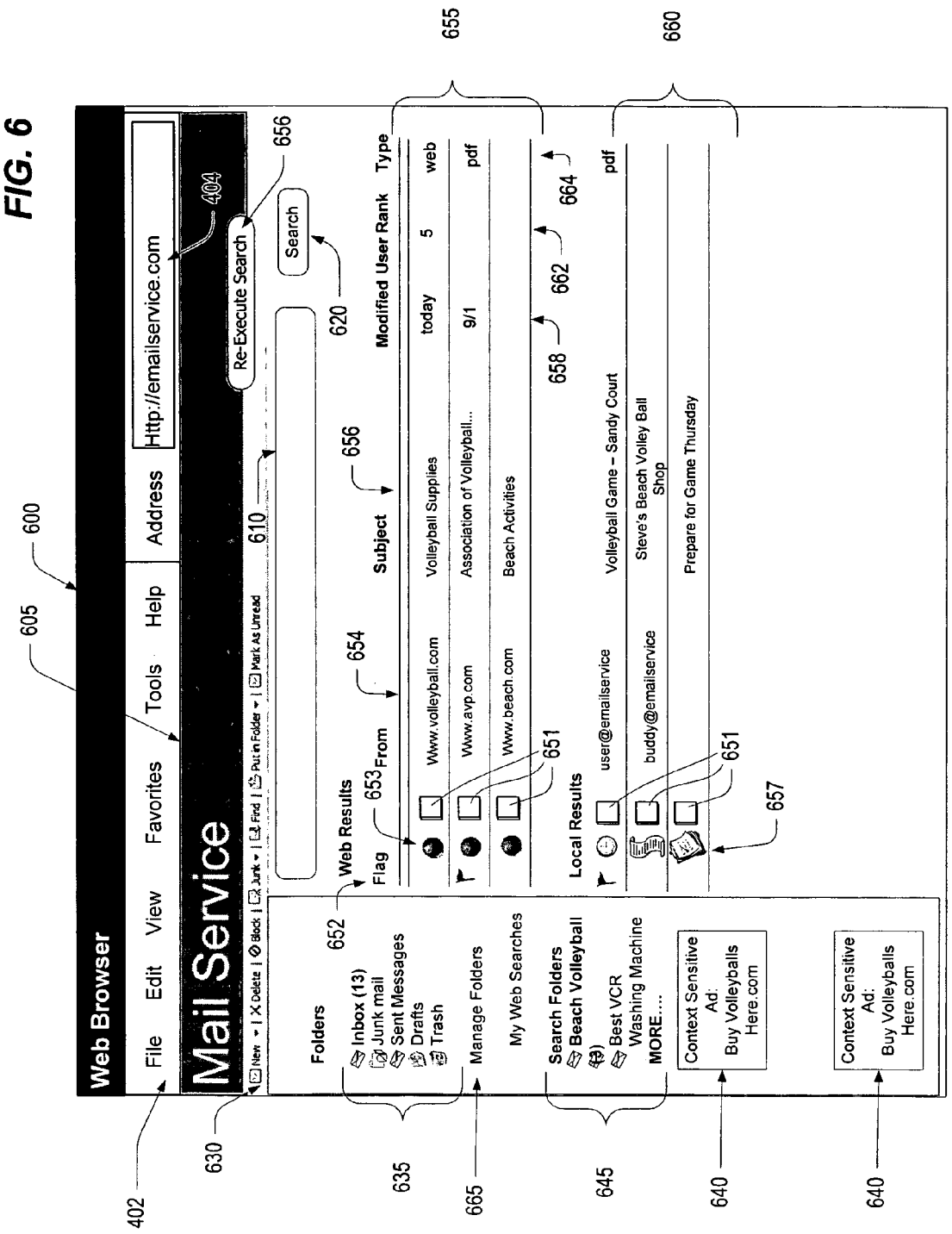
FIG. 6 is a depiction of a second user interface presented a user in accordance with the present invention.

At step 328, if the system is called to open a window in the e-mail service displaying the search query results of a search stored in a search folder, interface 600 shown in FIG. 6 may be presented. Elements of FIG. 6 which are described above with respect to FIG. 4 are shown as having common reference numbers with those of FIG. 4.

A search result e-mail interface 600 is shown in the display window 605 of a web browser. The mail service interface 600 includes a mail service task initiation line 630 which allows user to perform tasks via the e-mail service. Such tasks include creating a new e-mail, deleting e-mails displayed in the display window 605, blocking certain types of e-mails, identifying e-mail as a junk e-mail, performing a find function within an e-mail data store, moving the e-mail to a particular folder, or marking an e-mail as read or unread. Mail service interface 605 also includes a folder status indicator 635 which shows the status of which folder the users has and indicate whether new information or unread information has been provided into the folder. As shown in FIG. 6, status folders 605 use some form of visual indicator to illustrate a change in the folder. In this example a bold highlight and a number in parenthesis that the user has 13 unread e-mails in the Inbox folder. Also provided in window 605 is a managed folders link 665 allowing the user to call functions from the e-mail system which can let the user create folders, move items between folders, and delete folders.

In a unique aspect of the invention, search results for the exemplary query "beach volleyball" are displayed in interface 600 view window 605 using an e-mail inbox paradigm at 655 and 660. Search results take the form of a standard e-mail view of e-mail items, with a plurality of columns 652, 653, 654, 656, 658, 662 and 664 each displaying a characteristic of the search result which can be sorted by the user via the interface 600. Two types of results are shown in interface 600—Internet (or "web") results and results from running the query against the user's data in a user data store ("local results"). In this context, results 655 and 660 are shown in a summary list view in a manner similar to how a user might see individual e-mail messages by an e-mail service. If the user has chosen to search both web and the user's date store, local results 660 may retrieve items from the user's e-mail, contact lists, to do lists, address book, or other data stored in e-mail data store 212 or contact store 211.

In a unique aspect of the present invention, the status of all search folders a user may have previously stored is provided in the folder status window 632. As shown in FIG. 6, the search folder status 645 shows the name (for example "beach volleyball") of each particular search, and the number of new or unread items in parenthesis. A visual indicator such as a new colored font or, in the example shown in FIG. 6, bolded text, is used to indicate to the user that new items have been added to his folder. As described below, the search query may be repeated and updated at regular intervals. The contents of each search, or a limited set of such contents (such as, for example, the first 50 results) may be stored as items in the email store in order to track when new items appear in subsequent executions of the search. Two additional searches "best VCR" and "washing machine" are also shown. A "more" link allows the user to see additional search folders not capable of being displayed in Window 605 due to space limitations on the display.

Interface 600 also includes a search query window 610 and a search execute button 620. The search query window 610 can allow the user to perform search queries from the interface 600 and can allow the user to search other items of the user's data including user's data stored in the e-mail data store 212 or contact store 211.

In one aspect, each time the particular e-mail search folder is called from the user's data store, the search query stored with the search folder attribute is re-executed for display. In an alternative embodiment, the user can manually re-execute the search by pressing a re-execute search link 656. In yet another embodiment, a timed process re-executes stored search folder queries on a regular basis. The frequency of repetition can be configured by the user or selected by the system administrator.

The e-mail paradigm display of search results allows the results to be manipulated by the user using the context links shown at the top of columns 652, 653, 654, 656, 658, 662 and 664 of the web results 655. In this context, result type indicator 653 and 652 can show the user which type of result is being displayed. For example, the display is of a web-based result, an icon such as a globe 650 can indicate to the user the result is from the world-wide web. Likewise, a clock icon at column 652 can indicate that the result is from the user's scheduling data, a task icon can indicate that the date is from the user's task data, and a note icon can indicate that the item is from the note data store. Although not specially shown in FIG. 6 or 4, it should be recognized that the list of elements which is retrieved by the search and displayed in e-mail service context, can include e-mail results as well.

For each list of results, each line item displays, for example, a number of fields which the user can use to manipulate the retrieved list of data. The characteristics shown for columns 652, 653, 654, 656, 658, 662 and 664 are exemplary of the types of characteristics one might see in an interface 600. A flag column 652 allows the user to highlight certain results by presenting a clickable flag element which the user can then sort the list by using well known techniques. The "from" column 654 shows the source of the data in the form of a web address. The "subject" column 656 shows a brief summary of the data which is coming from the particular source. The "modified" column 658 allows the user to determine when the particular item is added to the search. A "User Rank" column 662 allows the user to manually rank search results in terms of their relevance. The "Type" column 664 tells the user the document type of information which is provided. Examples of different types include a web page, a Word document, a PDF document, or other types. Other fields may be utilized to display the list of search results, including "date received" column. The "date received" column can indicate when a particular item may have been added to the results set of a saved search.

Each item from the user's personal data stored in the email data store 217 is stored as an item. The database schema for personal information stored as items includes information allowing the system to display information such as when an email is received, or when a contact record was modified. In a similar manner, each time a search is run using a saved search folder, some number of results from the search, or all results, are stored as items in the email data store 217 and associated with the user and the search query. Where the number of results is large, tracking may be limited to the first 50 ranked results. Storing item information for results allows tracking of when an item was initially received, when it may have been modified, and other information, including annotation information, for results retrieved by the search folder query. Because the search ranking algorithm for search results will generally be constant, older results will not be displayed as "new" results unless they become more relevant and are moved up in the ranking. A data format suitable for storing items related to search folders in accordance with the present invention is described with respect of FIG. 14.

Form element check boxes 651 may be provided next to each result to allow commands from the task initiation bar 630 to manipulate individual or multiple selected links simultaneously. The check boxes shown next to each additional line item in FIG. 6 allows the user to select individual elements of the results in the user interface and, in accordance with the task initiation bar 630 shown in FIG. 6, delete or block or identify certain items as junk. Additional options for this form may allow the user to completely block selected items from the displayed view.

In yet another aspect of the present invention, context sensitive ads 640 can be displayed based on the results of the search. Such ads can allow the user to generate revenue for providing the e-mail service and search functions.

In the embodiment in FIG. 3, the user begins the search process at the search service interface. In an alternative embodiment, the user can begin the search at the e-mail service interface.

Figure 7:
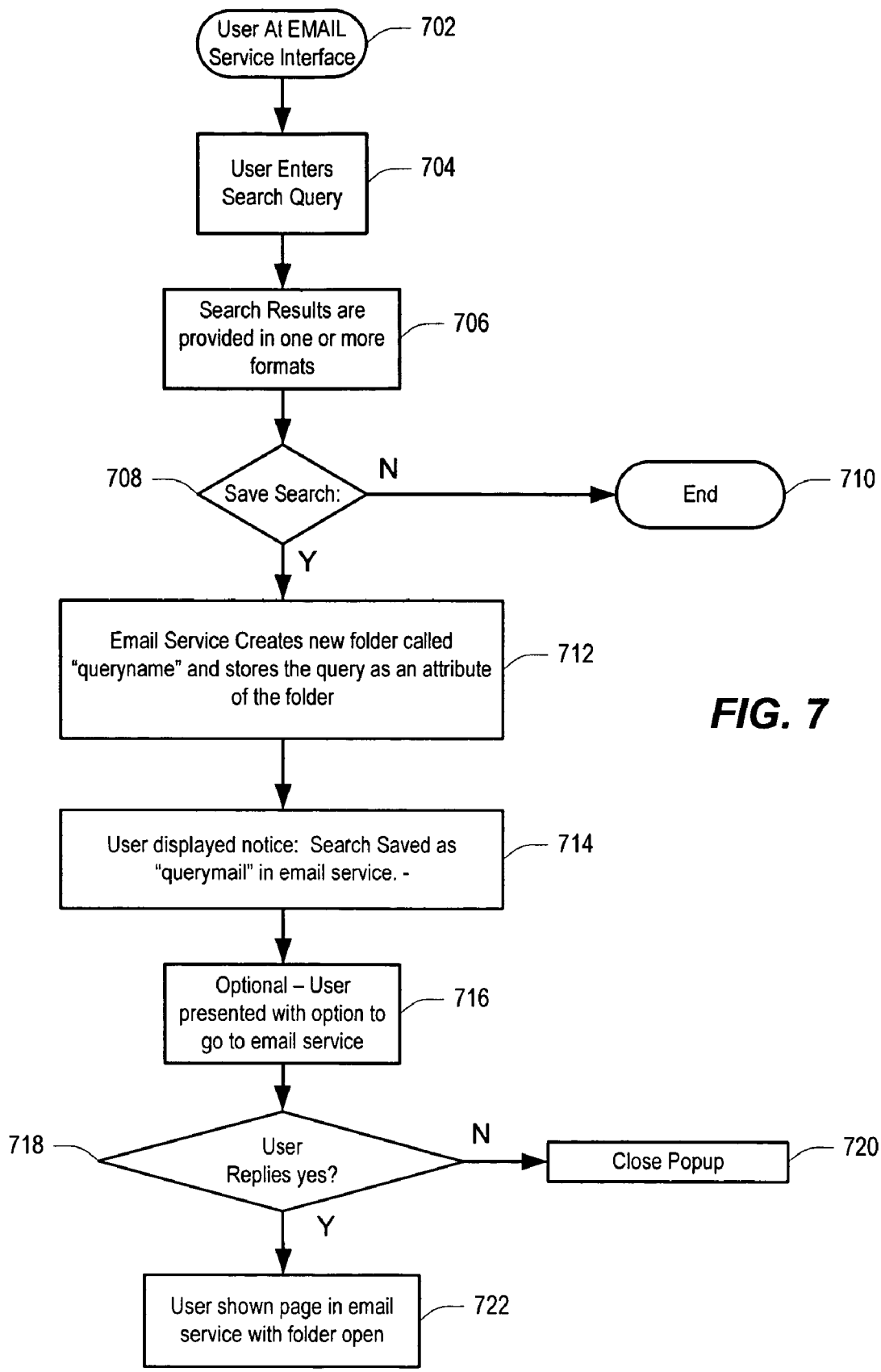
FIG. 7 is a flow chart representing an embodiment of the present invention where a user seeks to conduct a search via an e-mail service interface.
Figure 8:
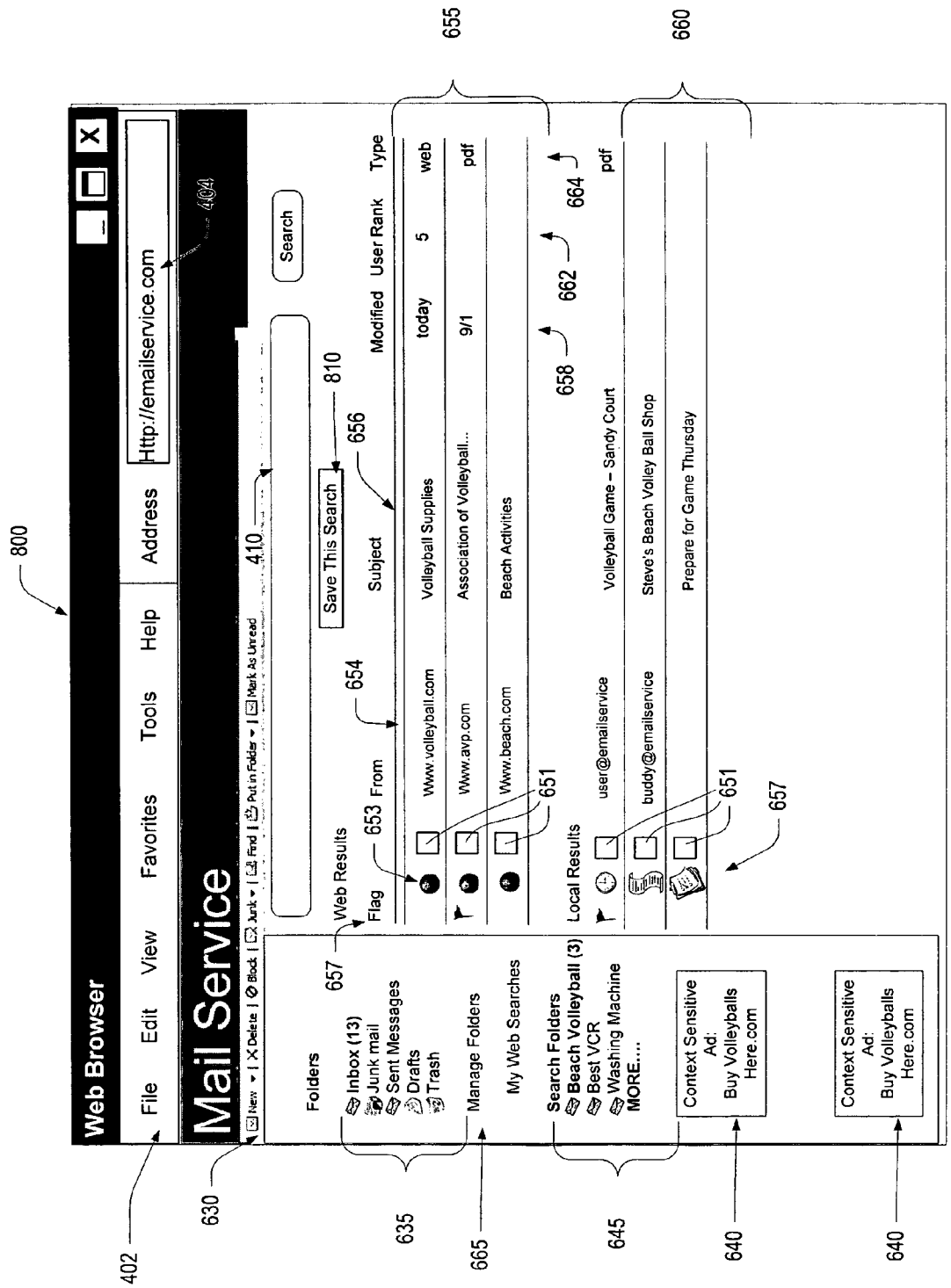
FIG. 8 is a depiction of another user interface including a save search link which is presented to user in accordance with the present invention.

FIG. 7 shows a flow chart for implementing a method in accordance with the present invention when the user attempts to perform a search and save the search results via the e-mail service interface. At step 702, a user will begin the process at the e-mail service interface. FIG. 8 shows an exemplary e-mail interface 800 presented to a user the first time a user begins a search from the e-mail service interface. Elements shown in FIG. 8 which have items in common with previous embodiments are identified with common reference numbers.

At step 704, in FIG. 7, the user enters a search query in the search query window 610. At step 706, the search results are provided back to the e-mail service in one or more formats and displayed accordingly as shown in FIG. 8. At step 708, the user will be presented with the option of whether the user wishes to save the search. In this context, as shown in FIG. 8, a "save this search" link 810 may be provided in Interface 800. If the user chooses to create a saved search, then the e-mail creates a new folder called "query name" and stores the query as an attribute of the folder at step 712. Once the e-mail service has created the new folder, a number of optional steps may be initiated. At step 714 the user may be presented with a notice "search saved at name "queryname" in e-mail service." The notice may be provided in a pop-up window such as that shown in FIG. 5. Again, at step 716, an optional step, the user may be presented with an option to go directly to the e-mail service. If, at step 718, the user replies yes, the user will be shown a page with the e-mail service with the search folder open. At this point, the interface of FIG. 6 would be displayed along the user to re-execute the query as described above.

Figure 9:
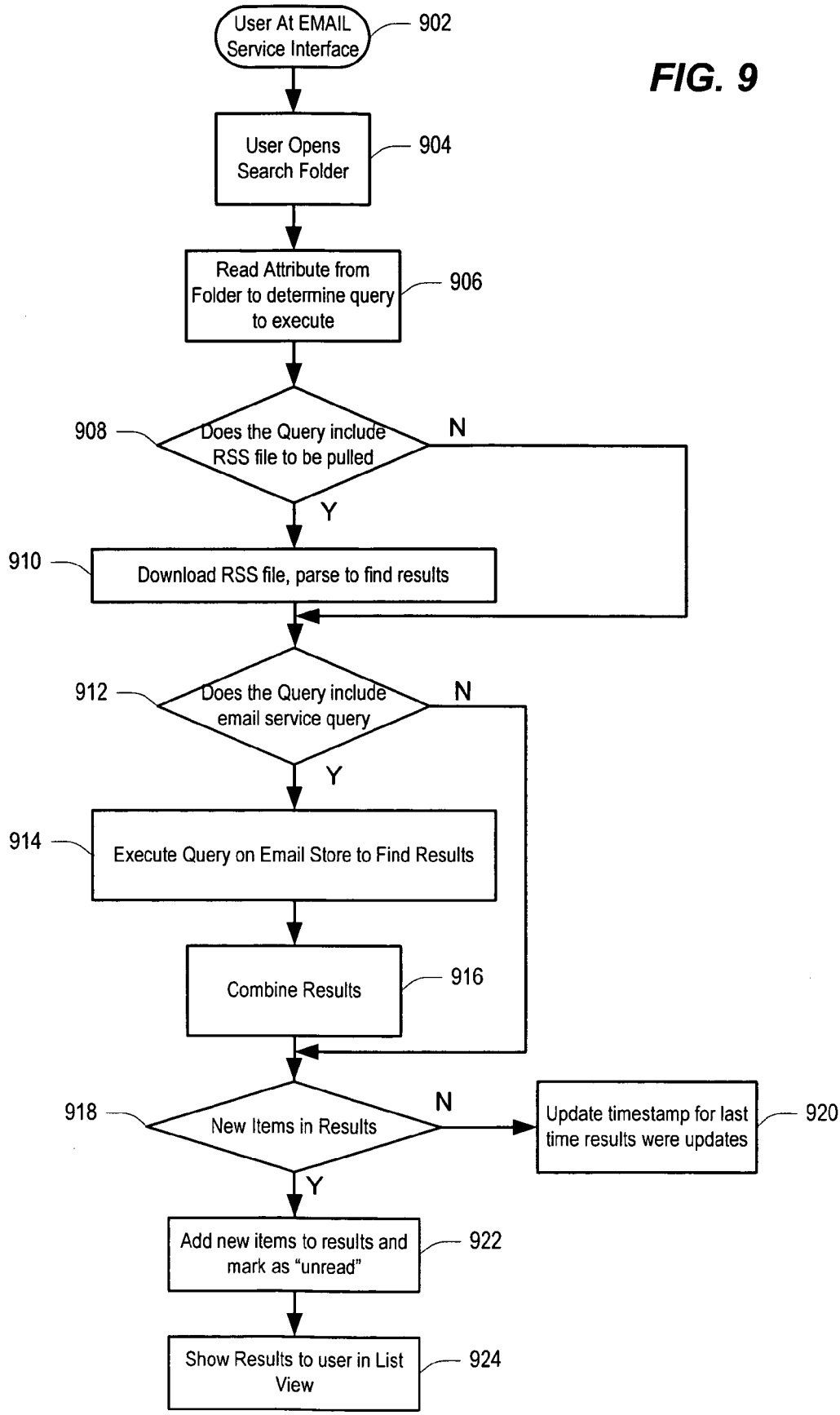
FIG. 9 is a flow chart representing an embodiment of the presenting invention for utilizing the search folder results in accordance with the present invention.

Once search queries have been saved in search folders in the e-mail system in accordance with the foregoing, users may manipulate the search folders in a number of ways similar to how users manipulate other folders in a computer interface. FIG. 9 shows a method for implementing the present invention including the processes run by the e-mail service when a user accesses a search folder via the e-mail interface.

Generally, search folders are accessible from the e-mail service interface at step 902. In the interface, users will open a search folder at 904 such as by single or double clicking on a displayed link to the folder in the user interface. At step 906, the e-mail service will read the search URL attribute from the folder to determine the query to execute at step 906. First, the system will determine at step 908 whether the query includes an RSS file to be retrieved. If so, the e-mail system 231 will send the query to search engine 212, download the RSS file, and parse the file to find the particular results to display in the display window at step 910. If there is no query included in an RSS file, or once the method completes step 910, the method will move to step 912. At step 912, the method will determine whether the query includes an execution of the query string on the user's domain data. This includes the data in the user's e-mail data store 212 and contact store 211. If the query includes an execution of the query string on the user's domain data, the query will be executed on the e-mail data store 212 and contact store 211 at step 914, and the results combined with those from the RSS file, if available, at step 916. If the query does not include the e-mail service data at step 912, or after completing step 916 the method moves to step 918.

At step 918, determination is made as to whether new items have been displayed in the search. New items can be identified by reference to stored items from an earlier execution of the search folder. Again, "new" items may simply be items moved higher in the search ranking by the search engine list ranking algorithm since the last execution of the search query. If no new items are shown as a result of step 918, the time stamp is updated at step 920 listing the last time the results were updated. If at step 918, new items have been added since the last execution of the search, then at step 922, new items are added to the results set and such new items are marked as "unread." The results are then displayed to the user at step 924.

Figure 10:
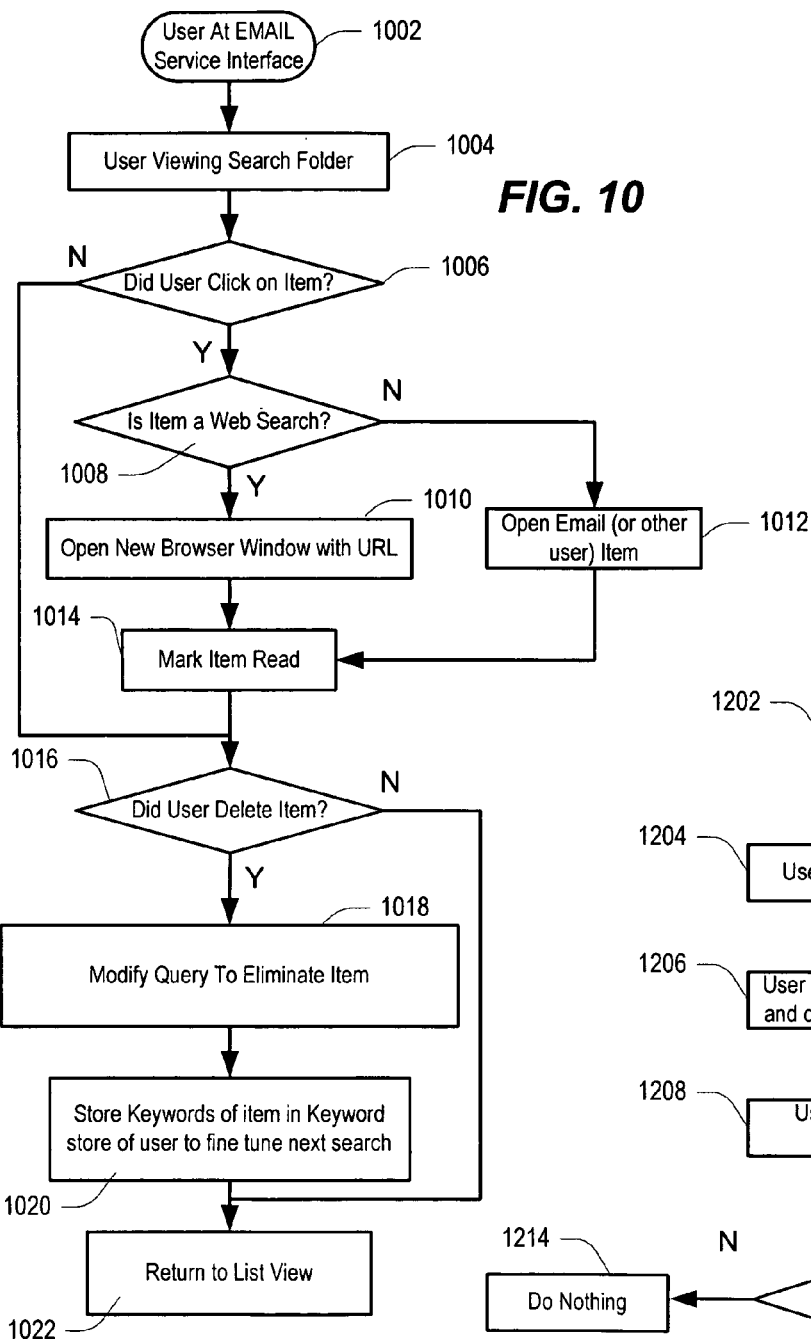
FIG. 10 is a flow chart representing a method for modifying search results stored in an e-mail folder in accordance with the current invention.

As noted above, a user can manipulate the query string in a number of ways within the user interface. FIG. 10 shows one embodiment of a method for manipulating the search result list. At FIG. 10, the user will be at an e-mail interface at step 1002 having a list of results from a stored search folder query presented. At step 1004, the user will be viewing a search folder that is displayed in a manner similar to FIG. 4 or 6. At step 1006, the method will determine whether a user selected a particular view in the list by clicking on a hyperlink of the result, or a check box 651 associated with the result line item. If a user clicks on the item, then at step 1008, a determination will be made as to whether or not the item is a web search result. If the item is a web search result, then a new browser window will be opened at step 1010 displaying the page associated with the URL identified for the particular web item. Once the item is viewed in the new window at step 1010, the item is marked as read at step 1014. If the item is not a web search result at step 1008, then the item is an e-mail, contact or other user data items stored in the e-mail store 212 or contact store 211 is opened at step 1012.

If the user did not click on a particular item at step 1006, or at the completion of step 1014, it is possible that the user has deleted an item. At step 1016, the method will determine whether the user has in fact deleted an item. If the user has deleted an item, then the query will be modified to eliminate the item. Modification of the query can include storing information associated with the query in a data record such as that shown in FIG. 14, or modifying the query string to delete or hide list items. At step 1020, the key words which will prevent the item from being displayed are stored in the search folder record to allow the next query to be fine-tuned. If the user did not delete the item in step 1016, then the user is returned to the list view at step 1022.

Modification of the search folder query to delete or hide list items can be performed at various levels of granularity. In one embodiment, when a user selects not to view items, the query string can be modified to eliminate results having a particular keyword in the result list. The keyword can comprise a domain name, or a keyword in some other portion of the list item. For example, if a user selects to delete an item from CNN.com, such deletion may be interpreted as eliminating all results from CNN.com from the query. Alternatively, the deletion may be more granular, allowing the user to delete specific items of interest from the particular result set. In a further embodiment, artificial intelligence may be used to determine commonality between individual characteristics of the items a user has deleted, making the search stored in the search folder more fine-tuned based on user preferences shown in individual or collective sets of search folders.

Figure 11:
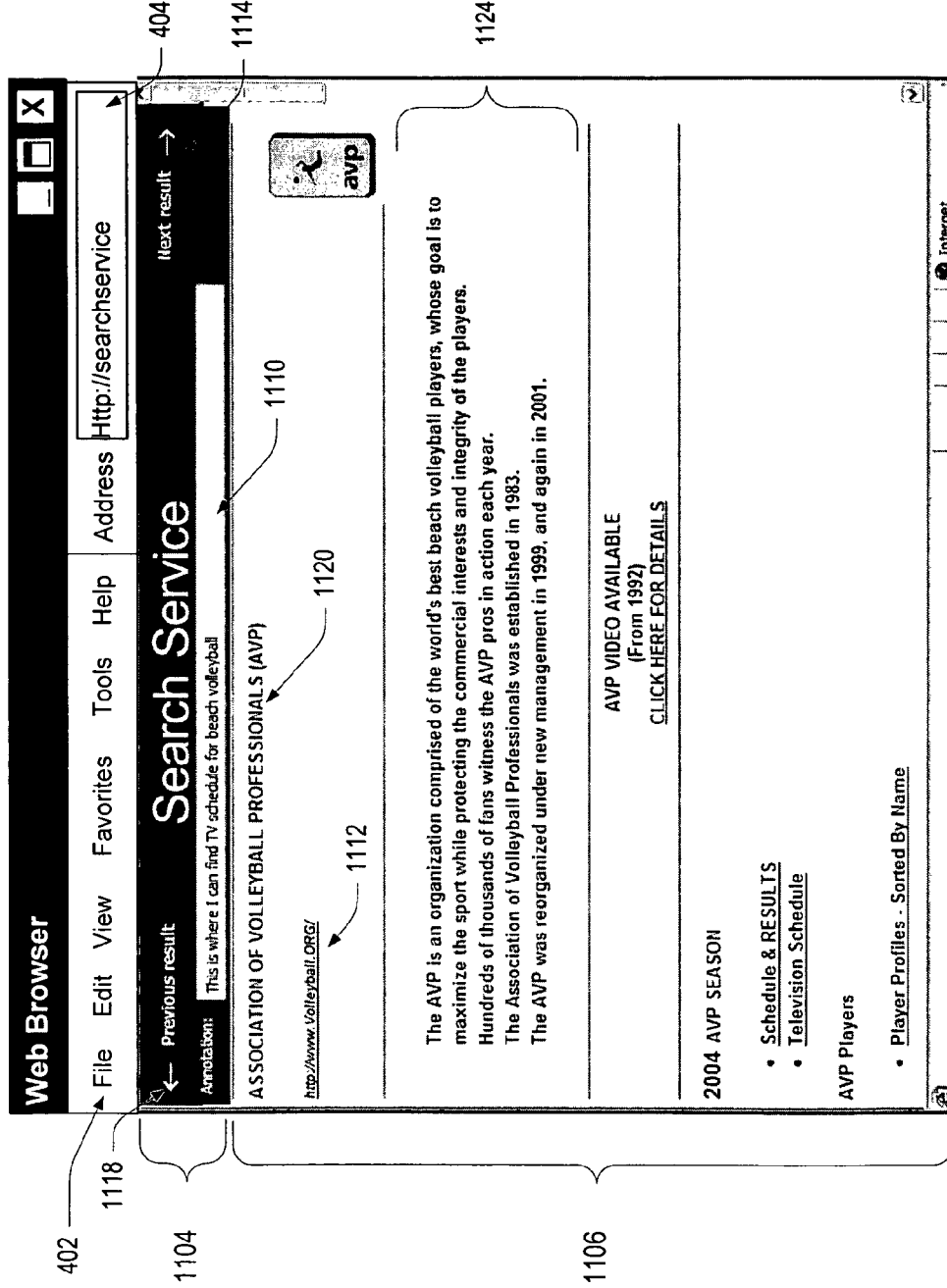
FIG. 11 is a depiction of a user interface for annotating a web page resulting from a search using the present invention.

In another unique aspect of the present invention, annotations can be provided by a user in addition to the user data store. FIG. 11 shows a user interface 1100 allowing a user to add annotations to the e-mail data record. In interface 1100, items which are described in previous embodiments of user interfaces have common reference numbers in FIG. 11. In user interface 1100, a particular search page 1124 which results from a stored search folder query is displayed in a lower frame 1106, while an upper frame 1106 provides the annotation and navigation functions. A hyperlink 1112 showing the address of the particular result is shown. The title of the search result is shown at 1120. The upper frame provides navigation links to allow the user to move to the next result 1114 or the previous result 1118 in the result set. Also provided is an annotation window 1110 which allows the user to type in particular comments associated with the result that may be thereafter displayed along with the particular result whenever the search folder query is run. Comments will be displayed in the annotation window 1110 each time the user clicks on the annotation search result. As shown in FIG. 11, the annotation search result can comprise a single line, but may also comprise multiple lines of text associated with each individual search result.

Figure 12:
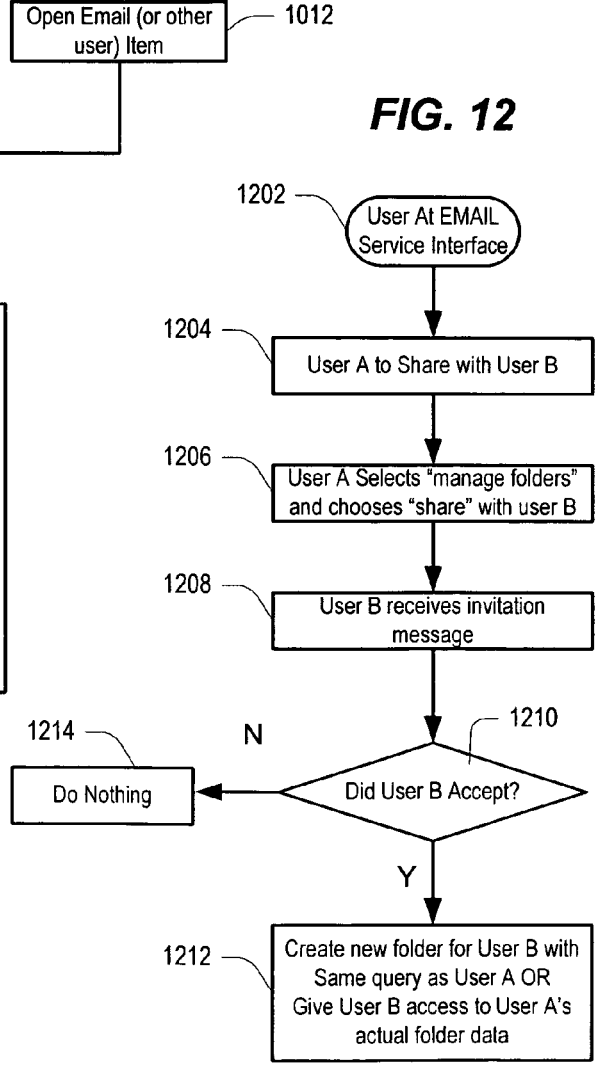
FIG. 12 is a flowchart depicting an embodiment of the present invention where users may share search query folders.
Figure 13:
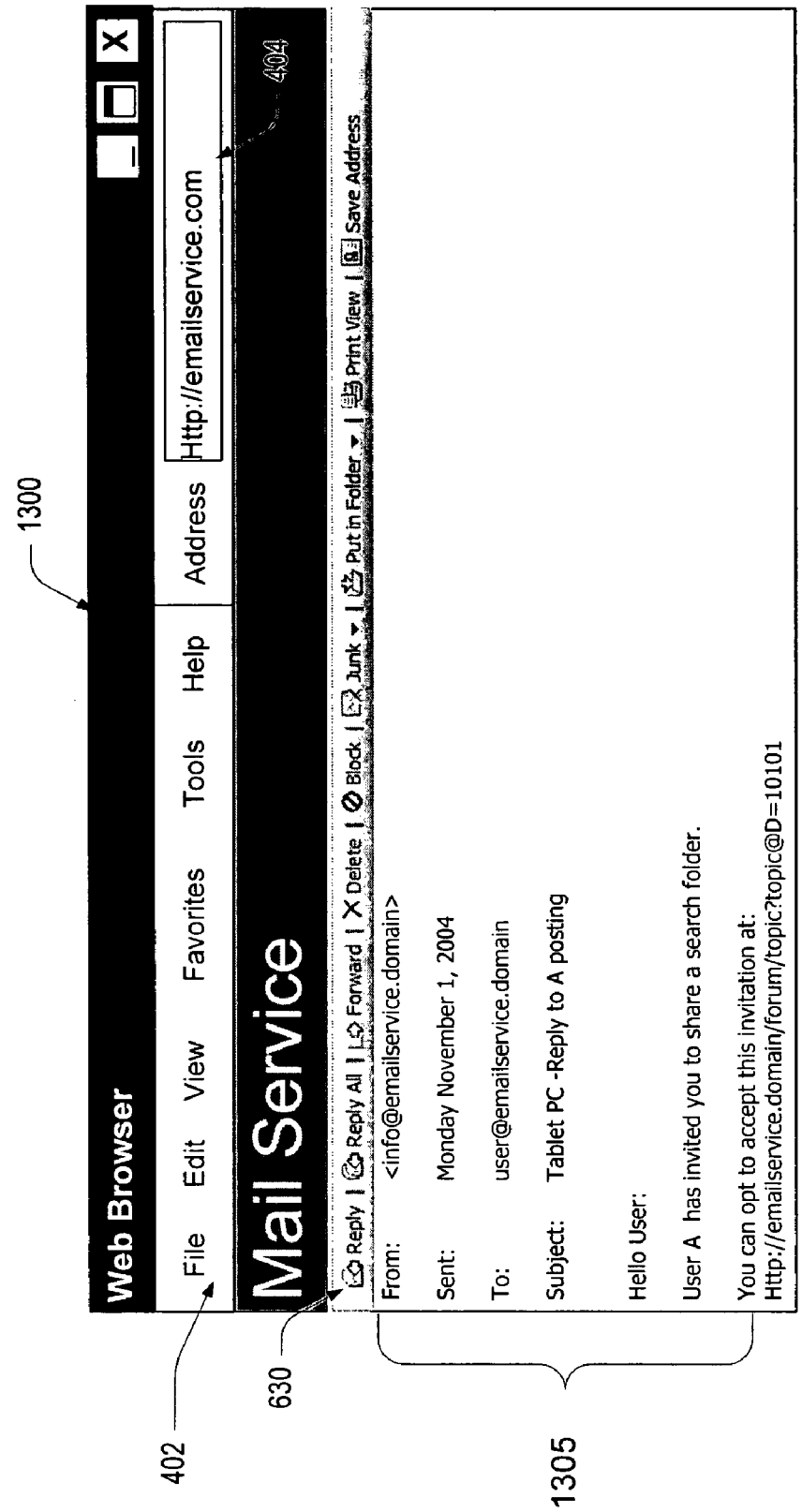
FIG. 13 is a depiction of a user interface for displaying notice to a second user from a first user that the first user wishes to share a folder with the second user.

In another unique aspect of the present invention, search folders can be shared with other users who are domain users. FIG. 12 shows a method for sharing search folders with other domain users. With the user starting at the e-mail interface at step 1202, a user "User A" choosing to share his information to second user at step 1204 selects the "manage folders" link at step 1206 and chooses to "share" a particular folder or multiple folders with a second user, "User B". At step 1208, User B will receive an invitation message allowing the user to link to the folder of User A. FIG. 13 is an example of in invitation message which can be e-mailed to User B. In alternative embodiments, the notification may be provided via an instant messaging system. User B can choose to accept the invitation at step 1210 and if the user accepts the invitation at step 1212, a new folder with data associated for User B can be created in User B's data on the e-mail data store 212. Alternatively, a permission set stored along with User A can allow User B to link directly to the data store of User A and run the query and see all the information stored with the User A's search folder. In this context, all the annotations stored by User A will appear to User B. If a new search folder is created for User B, such annotations may not be created or shared with User B. In yet another embodiment, for at least the first creation of the user data store for User B with User A's search folder, the annotations may be copied into User B's data store along with other information such as rankings, selections, modifications, and all manipulations that User A has performed in the search since the instantiation of the search by User A.

In the embodiment shown above, when items are re-executed in searches which, for one reason or another, may have been removed from the search results, such items can be displayed on the user interface using a visual representation to indicate their former presence. For example, when a user initiates a search, one or two particular items may appear which, over time, would not result in a subsequent execution in the search. The user can in this context, see which results are disappearing by some visual indication of the disappearance of such items. In one example, the font or color of the displayed link can change and can be "grayed out" indicating that the item is no longer retrieved by the result.

Figure 14:
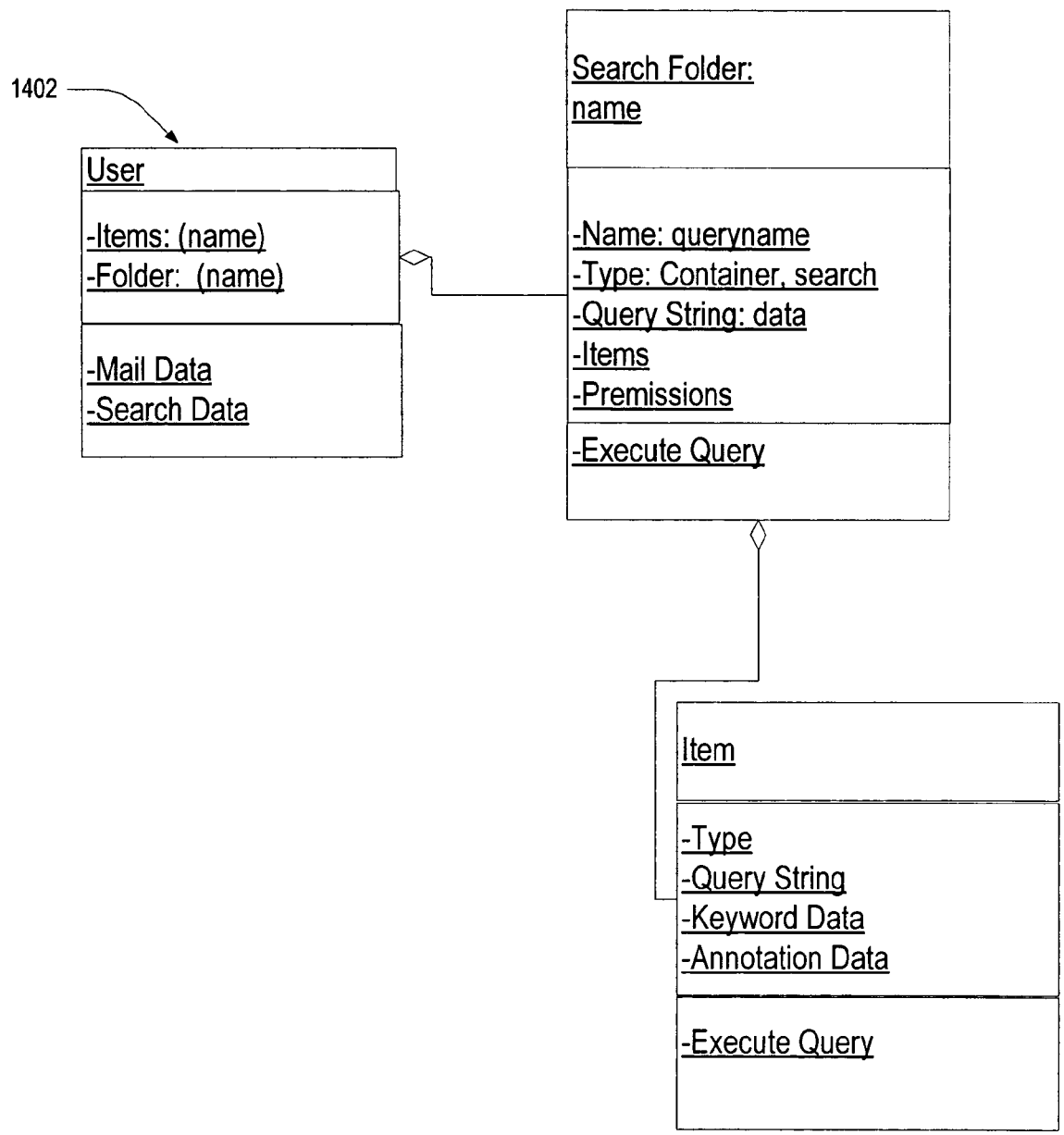
FIG. 14 is a UML diagram of a search folder data structure in accordance with the present invention.

FIG. 14 is a UML diagram of a portion of an item stored in email store 217 for a user. A user item record may include a user object 1402 which includes items attributes and folder name attributes. Each user object may include one or more search folder objects 1404 associated with the user object 1402. The items attribute can identify items—such as email data or other user data—associated with the user. The folder attribute identifies folders into which items are sorted by the user, and special folder types, such as search folders described herein Each search folder record 1404 include a name attribute, a type attribute, a query string attribute, one or more item attributes and a permissions attribute. The folder object may call an execute query method to run the search query string as described above. The type attribute identifies the folder as a search folder. The name attribute identifies the user's name for the search query folder. The query string is the initial user-stored search query along with any modifications (to delete keyword items from the results). The permissions attribute stores information other domain users allowed access to the search folder item.

One or more items 1406 may be associated with each user or search folder. An item record may include at type attribute, a result attribute, keyword data, annotation data, date modified data and date received data. The type attribute indicates the type of item (email, search folder information, etc.) that the item records. The result attribute stores a list result item (such as a web page URL retrieved from a previous execution of the search query) which the data in the item is associated with. The keyword data stores modification information for the search engine. The annotation data stores user annotations provided in the interface of FIG. 11.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for saving search query information on a server coupled to the Internet, comprising:

receiving search results from a search service, the search results are based on a search query containing search terms that were entered by a user and submitted to an Internet search engine able to find information stored on other websites;

displaying the search results in a search service user interface in a list format displaying each search result as a link to a website page and a summary of the content displayed in the website page, the search service user interface provides the user with a mechanism to save the search results;

in response to a user instruction to save the search results, creating a new folder definition containing a search query including the search terms entered by the user, the new folder definition is created by an email service;

storing the newly created folder definition in an email service database; and executing the search query on an email data store associated with the user, the email data store storing email messages intended for delivery to the user;

executing the search query on a contact store associated with the user, the contact store storing calendar events associated with the user;

receiving email messages from the email data store and calendar events from the contact store based on executing the search query;

displaying an email service user interface, the email service user interface displaying a search folder labeled with the search terms entered by the user, and further displaying the email messages, calendar events and search results stored in the search folder in an email inbox format.

2. The method of claim 1 wherein the email service database stores personal user information associated with the user, including at least email information.

3. The method of claim 2 further including the step of executing the search query against the email service database.

4. The method of claim 3 wherein the personal user information includes contact and calendar information.

5. The method of claim 4 further including the step of displaying search results of the search query run against the email service database in a common email inbox format.

6. The method of claim 5 wherein the email inbox format includes displaying one or more characteristics of each search result in a sortable column.

7. The method of claim 6 wherein one of said one or more characteristics includes a date received characteristic indicating when a search result was first received.

8. The method of claim 6 wherein one of said one or more characteristics includes a date modified characteristic indicating when a search result was last changed.

9. The method of claim 1 wherein the step of receiving search results from the search service includes the step of receiving annotation data associated with the search results.

10. The method of claim 1 further including the step of providing a list of search results in an email format to a user, the list of search results displaying a folder view representing the search query.

11. The method of claim 1 wherein the search results are in RSS format.

12. The method of claim 1 further including the step of providing a notification to the user that the new folder definition has been stored in the email service database.

13. The method of claim 1 further including the step of sharing said new folder definition with other users.

14. The method of claim 13 further including the step of storing permission information for other users in the new folder definition.

15. The method of claim 13 further including the step of storing the query associated with each other user for whom the search is shared.

* * * * *